Sept. 9, 1958　　W. B. WESTCOTT, JR　　2,851,231
LANDING GEAR ASSEMBLY
Filed Aug. 23, 1956　　2 Sheets-Sheet 2
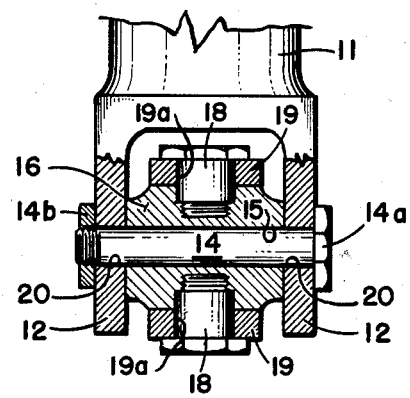
FIG. 4
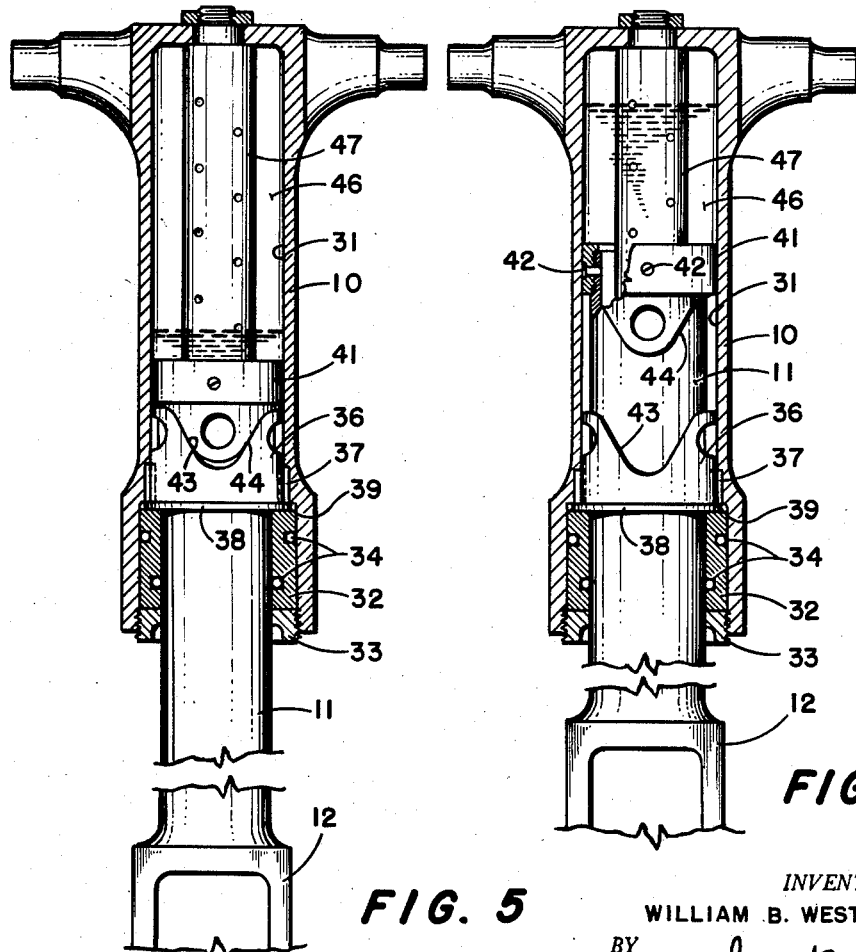
FIG. 5
FIG. 6
INVENTOR.
WILLIAM B. WESTCOTT, Jr.
BY
ATTORNEY United States Patent Office 2,851,231
Patented Sept. 9, 1958

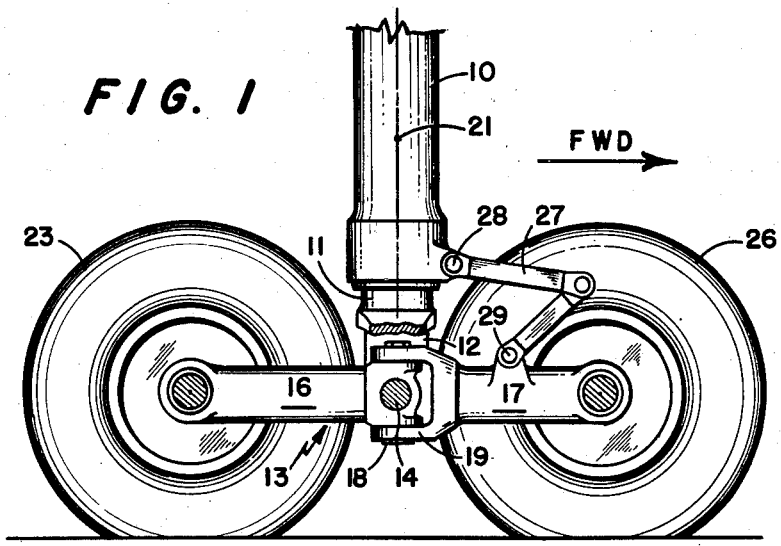
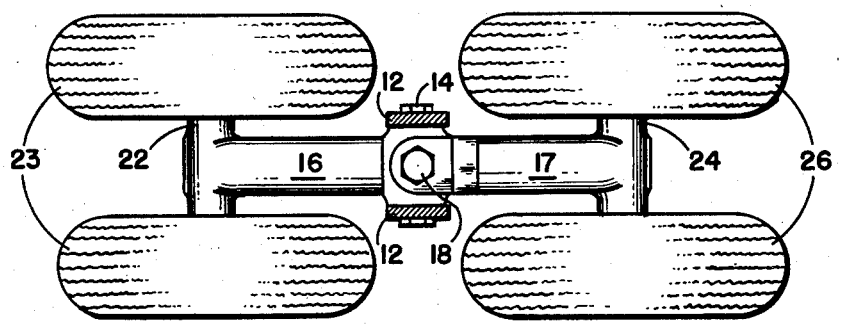
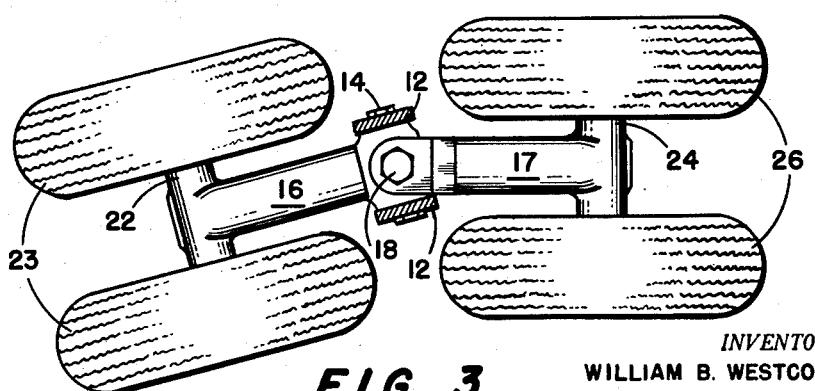

2,851,231

LANDING GEAR ASSEMBLY

William B. Westcott, Jr., Cleveland Heights, Ohio, assignor to Cleveland Pneumatic Industries, Inc., a corporation of Ohio Application August 23, 1956, Serial No. 605,795

10 Claims. (Cl. 244—103)

This invention relates generally to aircraft landing gears and more particularly to a tandem landing gear with pivoted wheels which do not scuff when the aircraft turns.

It is an important object of this invention to provide a landing gear wherein pivoting is provided to eliminate scuffing when the aircraft turns in co-operation with means to automatically lock the pivoting mechanism when the landing gear is retracted.

It is another important object of this invention to provide a new and simplified tandem landing gear wherein wheel pivoting is provided to permit the aircraft to turn without scuffing the tires in combination with means for automatically locking the pivoting mechanism in the straight-ahead position whenever the aircraft is airborne.

It is still another object of this invention to provide a tandem landing gear incorporating pivot means to eliminate tire scuffing when the aircraft is turned in combination with cam means within the landing gear spring which automatically locks the pivoting mechanism in a predetermined position whenever the spring moves to the fully extended position.

Further objects and advantages will appear from the following description and drawings, wherein:

Figure 1 is a side elevation partially in sections showing a landing gear according to this invention;

Figure 2 is a plan view showing the position of the wheels when all of the wheels are in the straight-ahead position, at which time the planes of wheel rotation are in alignment with a major axis of the aricraft;

Figure 3 is a view similar to Figure 2 showing the pivotal movement of the landing gear;

Figure 4 is an enlarged fragmentary section showing the details of the axle beam mounting;

Figure 5 is a side elevation partially in longitudinal section showing the landing gear spring mechanism in the fully extended position in which the pivotal mechanism is locked; and, Figure 6 is a view similar to Figure 5 showing the spring mechanism in a compressed position in which pivotal motion is possible.

In many large aircraft it has been found necessary to provide four or more wheels on each of the main landing gear struts in order to reduce the loading of the individual wheels while permitting the support of the large aircraft on the ground. Usually, such multiple wheel landing gears utilize a tandem arrangement wherein there are two pair of wheels with one pair mounted ahead of the other. If such wheels are rigidly mounted against pivotal movement relative to each other, the tires must slide sideways when the aircraft is turned on the ground. In some extreme cases, the tires have been rolled off the rim causing complete failure; furthermore sliding or scuffing itself causes unnecessary wear on the tire and promotes early failure. If at least one pair of the wheels is permitted to pivot relative to the others, the scuffing problem is materially reduced, since the fixed pair of wheels can then roll around the arc of turning while the pivoted pair track this movement without scuffing. If such a pivot arrangement is used, it is necessary to provide means to lock the pivot mechanism in a predetermined position before the landing gear is retracted so that the landing gear and wheels can be stored in the retraction well of the aircraft. If such a locking mechanism were not provided, the pivoted pair of wheels could flop around in any position within the range of the pivotal movement and it would be impossible to retract the landing gear into the minimum size well which must be provided in the aircraft. A landing gear, in the illustrated invention, incorporates a truck of four wheels having two pairs of two wheels each arranged in a tandem relationship with one pair in front of the other, wherein one pair may be pivoted relative to the other to eliminate scuffing of the tires during the ground handling of the aircraft in combination with simplified means for locking the pivot of the pivoted pair of wheels in a predetermined position relative to the fixed pair before the landing gear is retracted. It should be understood that a mechanism, according to this invention may be utilized when only two wheels are provided in a tandem relationship and that the disclosure of a truck using four wheels is merely illustrative of one embodiment.

Referring now to the drawings, Figure 1 discloses a representative landing gear including a cylinder 10, adapted to be mounted on the frame of an aircraft (not shown) and a piston 11, axially movable relative to the cylinder 10 and rotatable relative thereto around a vertical central axis 21. The lower end of the piston 11 is formed with a mounting fork 12 on which an axle beam assembly 13 is pivotally mounted by a pivot pin 14 which extends through a co-axial bore 20 formed in the mounting fork 12.

The axle beam assembly 13 includes a rearward axle beam 16 formed with a cross bore 15 (see Figure 4) through which the pivot pin 14 extends. One end of the pivot pin 14 is formed with a head 14A and the other end is provided with a threaded fastener 14B which co-operates to engage opposite sides of the mounting fork 12 to hold the pivot pin 14 in place. The various proportions are arranged so that the rearward axle beam 16 is free for pivotal movement relative to the piston 11 only around the axis of the pivot pin 14 which is perpendicular to and intersects the central axis 21. A forward axle beam 17 is formed with a forked portion which is proportioned to receive the forward end of the rearward axle beam 16 and a pair of co-axial pivot bores 19A through which pivot pins 18 extend. The pivot pins 18 are threaded into the rearward axle beam 16 and mount the forward axle beam 17 thereon for pivotal motion relative thereto around the axis of the pivot pins 18 which is perpendicular to the axis of the pivot pin 14 and intersects it at the intersection thereof with the central axis 21.

The rearward axle beam 16 is formed with a laterally extended axle 22 on which a rearward pair of wheels 23 are journaled with one wheel on either side of the rearward axle beam 17. The forward axle beam 17 is also formed with a lateral extending axle 24 on which is journaled a pair of forward wheels 26 which are arranged with one wheel on either side of the forward axle beam 17. A pair of torque arms 27 are pivotally connected between the cylinder 10 and the forward axle beam 17 as at 28 and 29 respectively and serve to prevent relative rotation between the cylinder 10 and forward axle beam 17 around the central axis 21 while permitting relative movement in all other directions.

The pivot pin 14 permits the axle beam assembly 13 to rotate relative to the piston 11 in a vertical plane so that all of the wheels will assume their proportional load when the aircraft is on the ground regardless of the attitude of the aircraft. The forward axle beam 17 is fixed against rotation relative to the cylinder 10 around the central axis 21, but the rearward axle beam 16 is free to pivot relative to the forward axle beam 17 around the pivot pins 18. This operation is shown by a comparison of Figures 2 and 3. In Figure 2, the planes of wheel rotation are parallel and the major axis of the aircraft which is the position they will assume when the aircraft is moving on the ground in a straight-ahead or forward direction and when the aircraft is airborne. If the aircraft is turned, the rearward axle beam 16 pivots relative to the forward axle beam 17 and permits the rearward wheels 23 to track the movement so that the aircraft can be turned on the ground without scuffing the tires. This is the condition which is present in Figure 3.

Reference should now be made to Figures 5 and 6 wherein the structure of the pivot-locking mechanism is shown. The cylinder 10 is formed with an axially extending bore 31 into which the piston 11 projects, and a gland member 32 is mounted in the cylinder 10 by a gland nut 33 which is threaded into the lower end of the cylinder 10. The gland member 32 serves as a bearing to prevent relative lateral motion between the cylinder 10 and piston 11 and is provided with fluid seals 34 for preventing leakage of fluid out of the bore 31. A first cam member 36 is positioned within the bore 31 around the piston 11 and is fixed against rotation by a plurality of keys 37. To prevent axial motion, the cam member 36 is formed with a radially extending flange 38 which extends radially between the shoulder 39 on the cylinder 10 and the gland member 32. A second cam member 41 is threaded on the piston 11 and is locked against rotation relative thereto by a plurality of lock pins 42. The first cam member 36 is formed with a V-shaped camming recess 43 and the second cam member 41 is formed with a V-shaped camming lobe 44 which co-operate to mutually engage and prevent relative rotation between the piston 11 and the cylinder 10 when the piston 11 is in the fully extended position shown in Figure 5. The camming lobe 44 and camming recess 43 are proportioned so that they will cause relative rotation between the piston 11 and the cylinder 10 back to a predetermined angular position as the piston 11 moves toward the fully extended position. So if the piston 11 is in any position within the pivotal range, other than the predetermined position, movement of the piston 11 to the fully extended position will cause the piston to rotate relative to the cylinder 10 until it is in the predetermined angular position wherein it is locked against rotation.

A chamber 46 within the bore 31 above the gland member 32 is filled with fluid under pressure to form the normal fluid spring utilized to support the weight of the aircraft when it is on the ground. In normal practice, this chamber is filled partially with a gas under pressure and partially with hydraulic oil. A plunger tube 47 is mounted on the cylinder 10 which projects into the piston 11 and is provided with conventional damping orifices through which the oil within the chamber 46 must flow as the piston 11 moves axially relative to the cylinder 10. Since the oil within the chamber 46 is pressurized by the gas contained therein, a force reaction results on the piston 11 which urges the piston 11 axially toward the fully extended position shown in Figure 5, and this is the position the elements assume whenever the landing gear is not supporting the weight of the aircraft on the ground. Therefore, whenever the aircraft is airborne, the piston 11 is in the fully extended position and is locked against rotation relative to the cylinder 10. When the aircraft is on the ground, the piston 11 is axially moved toward the compressed position shown in Figure 6, at which time the two cam members 36 and 41 are spaced from each other, so relative rotation between the piston 11 and the cylinder 10 is permitted.

Since the rearward axle beam 16 is fixed against rotation relative to the piston 11, around the central axis 21, by the pivot pin 14, the rearward axle beam 16 can pivot relative to the cylinder 10 around the central axis 21 only when the piston 11 is free from such pivotal movement. Again, since the piston 11 is free for pivotal movement relative to the cylinder 10 whenever the landing gear is supporting the weight of the aircraft, the rearward axle beam 16 is free to pivot relative to the cylinder 10 and in turn the forward axle beam 17 whenever the aircraft is on the ground. However, once the aircraft is airborne, the piston 11 moves to the fully extended position so the piston 11 is locked in its predetermined position by the action of the cam members 36 and 41, under the influence of the fluid under pressure in the chamber 46. Therefore, the rearward axle beam 16 is locked relative to the cylinder 10 and in turn, the forward axle beam 17 whenever the aircraft is airborne.

Those skilled in the art will recognize that by utilizing this simplified strut, it is possible to provide pivotal action of one pair of wheels and a simplified lock mechanism which utilizes pre-existing structure for its operation. This results in a new combination which meets all the physical requirements of a tandem type landing gear without requiring additional complex equipment.

Although the preferred embodiment of this invention is illustrated it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed descriptions are determinative of the scope of the invention.

I claim:

1. A landing gear comprising a pair of telescoping elements rotatable relative to each other around a central axis and capable of relative axial motion, a first ground engaging member supported on one of said elements rotatable relative thereto about said central axis, a second ground engaging member supported on said one element fixed against rotation relative thereto about said central axis, torque means operatively connected between the other of said elements and said first ground engaging member preventing relative rotation therebetween around said central axis, and means operatively connected between said elements operated by virtue of relative axial motion between said elements in one direction rotating said one element to a predetermined rotational orientation relative to said other element.

2. A landing gear comprising a pair of telescoping elements rotatable relative to each other around a central axis and capable of relative axial motion between an extended and a compressed position, resilient means associated with said elements urging said elements toward said extended position, a first ground engaging member supported on one of said elements rotatable relative thereto about said central axis, a second ground engaging member supported on said one element fixed against rotation relative thereto about said central axis, torque means operatively connected between the other of said elements and said first ground engaging member preventing relative rotation therebetween around said central axis, and means operatively connected between said elements operated by virtue of relative axial movement to said extended position rotating said one element to a predetermined rotational orientation relative to said other element.

3. A landing gear comprising a pair of telescoping elements rotatable relative to each other around a central axis and capable of relative and axial motion between an extended and a compressed position, resilient means associated with said elements urging said elements toward said extended position, a first ground engaging wheel supported on one of said elements pivoted for rotation relative thereto about said central axis, a second ground engaging wheel supported on said one element fixed against rotation relative thereto about said central axis, torque means operatively connected between the other of said elements and said first ground engaging member preventing relative rotation therebetween around said central axis, and cam means operatively connected between said elements operated by virtue of relative axial motion to said extended position rotating said one element until said wheels are parallel.

4. A landing gear comprising a first member adapted to be mounted on an aircraft, a second member connected to said first member for rotation relative thereto around a first axis, a first axle beam supported by said second member and fixed against rotation relative thereto around said first axis, a second axle beam pivotally supported by said second member for rotation relative thereto about said first axis, a ground engaging wheel journaled in each of said axle beams, torque means connecting said second axle beam and first member preventing relative rotation therebetween around said first axis, and a releasable lock connecting said members normally preventing rotation of said second member relative to said first member.

5. A landing gear comprising a first member adapted to be mounted on an aircraft, a second member connected to said first member for rotation relative thereto around an axis, a first axle beam pivotally supported by said second member and fixed against rotation relative thereto around said axis, a second axle beam supported by one of said members and fixed against rotation relative to said first member around said axis, a wheel mounted in each of said axle beams, and a releasable lock connecting said members normally preventing rotation of said second member relative to said first member.

6. A landing gear comprising a first member adapted to be mounted on an aircraft, a second member connected to said first member for rotation relative thereto around a first axis, a first axle beam supported by said second member and fixed against rotation relative thereto around said first axis, a second axle beam supported by said second member for rotation relative thereto about an axis intersecting said first axis, a ground engaging wheel journaled in each of said axle beams, torque means operatively connected between said second axle beam and first member preventing relative rotation therebetween around said first axis, and a releasable lock connecting said members normally maintaining both wheels parallel.

7. A landing gear comprising a first member adapted to be mounted on an aircraft, a second member connected to said first member for rotation relative thereto around a first axis, a first axle beam supported by said second member extending therefrom in a rearward direction, said first axle beam being fixed against rotation relative to said second member around said first axis, a second axle beam supported by said second member extending therefrom in a forward direction; said second axle beam being rotatable relative to said second member around said first axis, a ground engaging wheel mounted in each of said axle beams, torque means operatively connected between said second axle and said first member preventing relative rotation therebetween around said first axis, and a releasable lock connecting said members normally preventing rotation of said second member relative to said first member.

8. A landing gear comprising a cylinder, a piston rotatable relative to said cylinder around a central axis and axially movable relative thereto between an extended and a compressed position, fluid pressure means associated with said piston urging said piston toward said extended position, a first ground engaging member supported on said piston for rotation relative thereto about said central axis, a second ground engaging member supported on said piston fixed against rotation relative thereto about said central axis, torque means operatively connected between said cylinder and first ground engaging member preventing relative rotation therebetween around said central axis, and cam means connected to said piston and cylinder operated by virtue of movement of said piston to said extended position rotating said piston to a predetermined rotational orientation relative to said cylinder.

9. A landing gear comprising a first member adapted to be mounted on an aircraft, a co-operating second member rotatable relative to said first member around a first axis and axially movable relative thereto between an extended and a compressed position, means associated with said members urging said second member axially toward said extended position, a first axle beam pivoted on said second member for rotation relative thereto about a second axis perpendicular to and intersecting said first axis, a second axle beam pivoted on said first axle beam for rotation relative thereto about a third axis perpendicular to said second axis and intersecting said second axis at the intersection thereof with said first axis, torque means connected between said first member and second axle beam preventing relative rotation therebetween around said first axis, a ground engaging wheel on each of said axle beams, and means operatively connected to said members operated by virtue of movement of said second member to said extended position locking said first and second members against relative rotation around said first axis in a position wherein said wheels are parallel.

10. A landing gear comprising a first member adapted to be mounted on an aircraft, a co-operating second member rotatable relative to said first member around a first axis and axially movable relative thereto between an extended and a compressed position, fluid pressure means associated with said members urging said second member axially toward said extended position, a first axle beam pivoted on said second member for rotation relative thereto about a second axis perpendicular to and intersecting said first axis, a second axle beam pivoted on said first axle beam for rotation relative thereto about a third axis perpendicular to said second axis and intersecting said second axis at the intersection thereof with said first axis, torque means connected between said first member and second axle beam preventing relative rotation therebetween around said first axis, said first axle beam extending rearward from said second member and said second axle beam extending forward therefrom, a ground engaging wheel on each of said axle beams, and means operatively connected between said members operated by virtue of movement of said second member to said extended position locking said first and second members against relative rotation around said first axis in a position wherein said wheels are parallel.

References Cited in the file of this patent

UNITED STATES PATENTS

| | | |
|---|---|---|
| 2,291,518 | Wells | July 28, 1942 |
| 2,478,705 | Paxhia et al. | Aug. 9, 1949 |